(12) United States Patent
Lee et al.

(10) Patent No.: US 9,671,633 B2
(45) Date of Patent: Jun. 6, 2017

(54) DISPLAY DEVICE AND METHOD OF MANUFACTURING THE SAME

(71) Applicant: Samsung Display Co., Ltd., Yongin-si, Gyeonggi-do (KR)

(72) Inventors: Dae Ho Lee, Seoul (KR); Seong Gyu Kwon, Suwon-si (KR); Hee Keun Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/848,144

(22) Filed: Sep. 8, 2015

(65) Prior Publication Data
US 2016/0195748 A1    Jul. 7, 2016

(30) Foreign Application Priority Data

Jan. 5, 2015 (KR) .......................... 10-2015-0000693

(51) Int. Cl.
*G02F 1/1333* (2006.01)
*G02F 1/1335* (2006.01)
*G02F 1/1341* (2006.01)

(52) U.S. Cl.
CPC ...... *G02F 1/133345* (2013.01); *G02F 1/1341* (2013.01); *G02F 1/133377* (2013.01); *G02F 1/133512* (2013.01)

(58) Field of Classification Search
CPC ............. G02F 1/1368; G02F 1/136286; G02F 1/133345; G02F 1/133512; G02F 1/133514; G02F 1/134309; G02F 1/134363; G02F 1/136227; G02F 1/136209; G02F 1/134336; G02F 1/1341; G02F 1/1362; G02F 1/133723; G02F 1/1335; G02F 1/133711; G02F 1/1333; G02F 1/133305; G02F 1/133377; G02F 1/133553; G02F 1/1343; G02F 2001/134372; G02F 2001/133357; G02F 2001/136222; G02F 2001/134318; G02F 2001/136218; G02F 2201/52; G02F 2201/50; H01L 29/78633; H01L 29/786; H01L 29/41733; H01L 29/78669;
(Continued)

(56) References Cited

U.S. PATENT DOCUMENTS

2013/0077034 A1\* 3/2013 Jung .................. G02F 1/1345
349/122
2013/0250220 A1\* 9/2013 Kim ................... G02F 1/1341
349/123

FOREIGN PATENT DOCUMENTS

JP    2008-242031    10/2008
JP    2009-192801    8/2009
(Continued)

*Primary Examiner* — Thoi Duong
(74) *Attorney, Agent, or Firm* — Innovation Counsel LLP

(57) ABSTRACT

There is provided a display device including a substrate, a black matrix disposed on one side of the substrate, a thin film transistor disposed on the other side of the substrate, a common electrode and a pixel electrode disposed on the thin film transistor and overlapping with each other with an insulating layer disposed therebetween, a roof layer formed to be spaced apart from the pixel electrode and the common electrode with a microcavity disposed therebetween, including a supporting member, and having an injection hole through which a portion of the microcavity is exposed, a liquid crystal layer filling the microcavity, and an overcoat formed on the roof layer so as to cover the injection hole and sealing the microcavity.

10 Claims, 19 Drawing Sheets

(58) Field of Classification Search
CPC . H01L 27/12; H01L 27/1218; H01L 27/3272; G06F 3/0412; G06F 2203/04107; G09G 2300/0452
USPC ... 349/43, 106, 123, 110, 153, 42, 138, 139, 349/158; 438/151, 158
See application file for complete search history.

(56) References Cited

FOREIGN PATENT DOCUMENTS

| | | |
|---|---|---|
| KR | 10-688958 | 3/2007 |
| KR | 10-0773872 | 11/2007 |
| KR | 10-2008-0049193 | 6/2008 |
| KR | 10-2013-0124827 | 11/2013 |
| KR | 10-1338109 | 12/2013 |
| KR | 10-2014-0058773 | 5/2014 |

* cited by examiner

DISPLAY DEVICE AND METHOD OF MANUFACTURING THE SAME

CROSS-REFERENCE TO RELATED APPLICATION

This application claims priority to and the benefit of Korean Patent Application No. 10-2015-0000693 filed in the Korean Intellectual Property Office on Jan. 5, 2015, the entire contents of which are incorporated herein by reference.

BACKGROUND (a) Field

The present inventive concept relates a display device and a method of manufacturing the same.

(b) Description of the Related Art

A liquid crystal display is one of flat panel displays that have been most widely used, includes two display panels on which field generating electrodes such as a pixel electrode and a common electrode are formed, and a liquid crystal layer disposed between the two display panels, and displays an image by applying a voltage to the field generating electrode to generate an electric field in the liquid crystal layer, determining alignment of liquid crystal molecules of the liquid crystal layer through the electric field, and controlling polarization of incident light.

The two display panels constituting the liquid crystal display may include a thin film transistor array panel and an opposite display panel. On the thin film transistor array panel, a gate line for transmitting a gate signal and a data line for transmitting a data signal are formed to cross each other and a thin film transistor connected to the gate line and the data line, and a pixel electrode, etc. connected to the thin film transistor are formed. On the opposite display panel, a light blocking member, a color filter, a common electrode, etc. may be formed. According to a situation, the light blocking member, the color filter, and the common electrode may be formed on the thin film transistor array panel.

However, a conventional liquid crystal display needs two substrates and includes respective elements formed on the two substrates, and thus problems arise in that the display device is heavy and thick and has high manufacturing costs and long manufacturing time.

The above information disclosed in this Background section is only for enhancement of understanding of the background of the inventive concept and therefore it may contain information that does not form the prior art.

SUMMARY

The present inventive concept has been made in an effort to provide a display device and a method of manufacturing the same, having advantages of reducing weight, thickness, costs, and manufacturing time by manufacturing the display device using one substrate.

Another embodiment of the present inventive concept provides a display device and a method of manufacturing the same, for preventing a liquid crystal layer from being contaminated by a black matrix and simplifying a process by forming the black matrix below a substrate.

An exemplary embodiment of the present inventive concept provides a display device including a substrate, a black matrix disposed on one side of the substrate, a thin film transistor disposed on the other side of the substrate, a common electrode and a pixel electrode disposed on the thin film transistor and overlapping with each other with an insulating layer disposed therebetween, a roof layer formed to be spaced apart from the pixel electrode and the common electrode with a microcavity disposed therebetween, including a supporting member, and having an injection hole through which a portion of the microcavity is exposed, a liquid crystal layer filling the microcavity, and an overcoat formed on the roof layer so as to cover the injection hole and sealing the microcavity.

The substrate may cover the black matrix and may be formed of a flexible material.

The flexible material may be polyamide or polyimide.

The display device may further include a lower insulation substrate formed below the black matrix.

The lower insulation substrate may be formed of a flexible material.

A plurality of microcavities may be arranged on the substrate in a matrix form, and the plurality of microcavities may be spaced apart from each other with a plurality of first valleys and a plurality of second valleys disposed therebetween. The plurality of the first valleys extend along a direction in which a gate line extends and the plurality of the second valleys extend along a direction in which a data line extends.

The black matrix may be formed below the substrate only at a position corresponding to the plurality of the first valleys.

The black matrix may further comprise an upper black matrix formed on the other side of the substrate at a position in which the plurality of the first valleys are formed. The black matrix may be formed at a position corresponding to the plurality of the first valleys.

A width of the upper black matrix may be smaller than a width of the plurality of the first valleys.

The black matrix may have a first black matrix and a second black matrix which may be formed at positions corresponding to opposite edges of the first valley, respectively.

Another exemplary embodiment of the present inventive concept provides a method of manufacturing a display device, including forming a black matrix on a carrier glass, forming a substrate covering the black matrix, forming a thin film transistor on the substrate, forming a first insulating layer on the thin film transistor, forming a pixel electrode connected to the thin film transistor on the first insulating layer, forming a sacrificial layer on the pixel electrode, forming a roof layer on the sacrificial layer, patterning the roof layer to form a liquid crystal injection hole and expose the sacrificial layer, removing the sacrificial layer to form a microcavity between the pixel electrode and the roof layer, forming an alignment layer by injecting an alignment layer material into the microcavity, forming a liquid crystal layer by injecting a liquid crystal material into the microcavity, forming an overcoat on the roof layer to seal the microcavity, and removing the carrier glass.

The substrate may cover the black matrix and may be formed of a flexible material.

The flexible material may be polyamide or polyimide.

The forming of the black matrix on the carrier glass may include forming a lower insulation substrate on the carrier glass and then forming a black matrix.

The lower insulation substrate may be formed of a flexible material.

In the removing of the sacrificial layer, a plurality of microcavities may be arranged on the substrate in a matrix form, and the plurality of microcavities may be spaced apart from each other with a plurality of first valleys and a plurality of second valleys disposed therebeween. The plurality of the first valleys extend along a direction in which a gate line extends and the plurality of the second valleys extend along a direction in which a data line extends.

In the forming of the black matrix on the carrier glass, the black matrix may be formed on the carrier glass only at a position corresponding to the first valley on the carrier glass.

The method may further include, between the forming of the pixel electrode connected to the thin film transistor on the first insulating layer and the forming of the sacrificial layer on the pixel electrode, forming an upper black matrix on the thin film transistor.

A width of the upper black matrix may be smaller than a width of a black matrix formed on the carrier glass.

The display device and the method of manufacturing the same according to the aforementioned exemplary embodiment of the present inventive concept have the following effects.

A display device and a method of manufacturing the same according to an exemplary embodiment of the present inventive concept may reduce weight, thickness, costs, and manufacturing time by manufacturing the display device using one substrate.

A display device and a method of manufacturing the same according to an exemplary embodiment of the present inventive concept may prevent a liquid crystal layer from being contaminated by a black matrix and simplify a process by forming the black matrix below a substrate since a separate capping layer does not have to be formed on the black matrix.

DETAILED DESCRIPTION OF THE EMBODIMENTS

Figure 1:
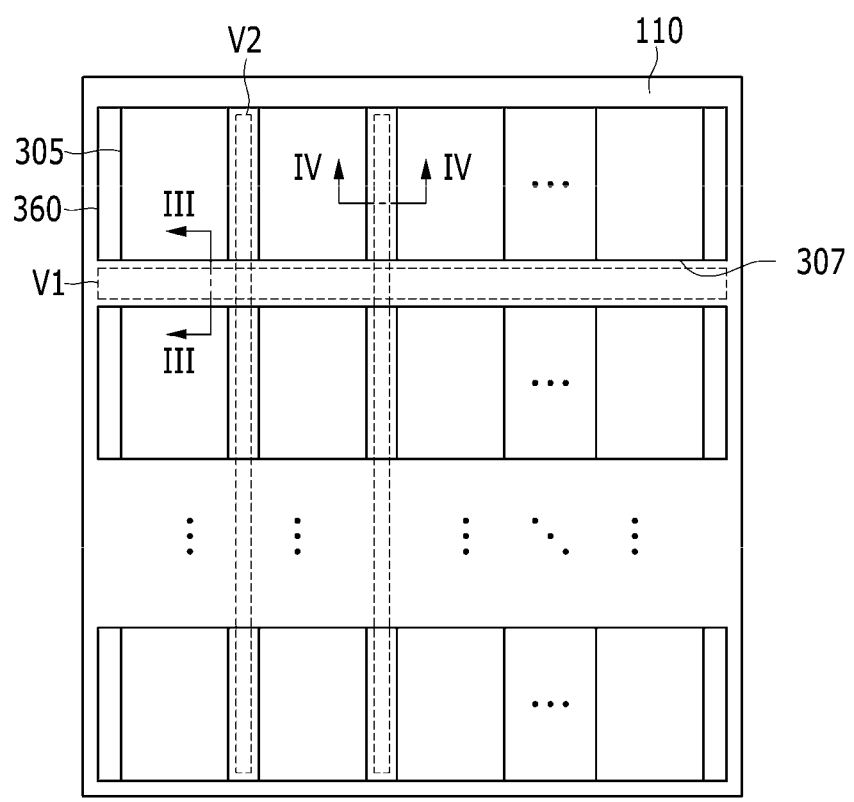
FIG. 1 is a top plan view illustrating a display device according to an exemplary embodiment of the present inventive concept.

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present between the element and the another element. In contrast, when an element is referred to as being "directly on" another element, there are no intervening elements present.

Hereinafter, a display device and a method of manufacturing the same according to an exemplary embodiment of the present inventive concept will be described in detail with reference to the accompanying drawings.

FIG. 1 is a top plan view illustrating a display device according to an exemplary embodiment of the present inventive concept.

The display device according to an exemplary embodiment of the present inventive concept includes a substrate 110 formed of a material such as glass, plastic, or the like.

Microcavities 305 covered by roof layers 360 are formed on the substrate 110. The roof layers 360 extend in a row direction and the plurality of microcavities 305 are formed below one roof layer 360.

The microcavities 305 may be disposed in a matrix form, a first valley V1 may be positioned between microcavities 305 that are adjacent in a column direction, and a second valley V2 may be positioned between microcavities 305 that are adjacent in a row direction.

Although described below, a thin film transistor, etc. may be formed on the first valley, and the first valley may be referred to as a thin film transistor forming region. In addition, barrier ribs for covering lateral surfaces of the microcavities 305 by the roof layer 360 are formed on the second valley, and the second valley may be referred to as a barrier rib forming region.

The plurality of the roof layers 360 are separated by the first valleys V1s disposed therebetween. A portion of the microcavity 305, which contacts the first valley V1, may not be covered by the roof layer 360 and may be externally exposed. This is referred to as an injection hole 307. The injection hole 307 may be formed at an edge of one side of the microcavity 305.

Each roof layer 360 is formed between adjacent first valleys V1s so as to be spaced apart from the substrate 110 to form the microcavity 305. That is, the roof layer 360 is formed to cover the remaining lateral surfaces except for a lateral surface of a first edge at which the injection hole 307 is formed. Accordingly, the roof layer 360 includes a side wall with three surfaces except for the lateral surface of the first edge and an upper surface for covering the side wall. In this case, a lateral surface positioned at an edge facing the injection hole 307 may be a horizontal supporting member and a lateral surface connected to the horizontal supporting member and positioned at an edge forming a side wall may be a vertical supporting member.

The aforementioned structure of a display device according to an exemplary embodiment of the present inventive concept is merely exemplary and may be changed in various ways. For example, arrangement of the microcavity 305, the first valley V1, and the second valley V2 may be changed, the plurality of roof layers 360 may be connected to each other on the first valley V1, and a portion of each roof layer 360 may be formed on the second valley V2 so as to be spaced apart from the substrate 110 so as to connect adjacent microcavities 305 to each other.

Figure 2:
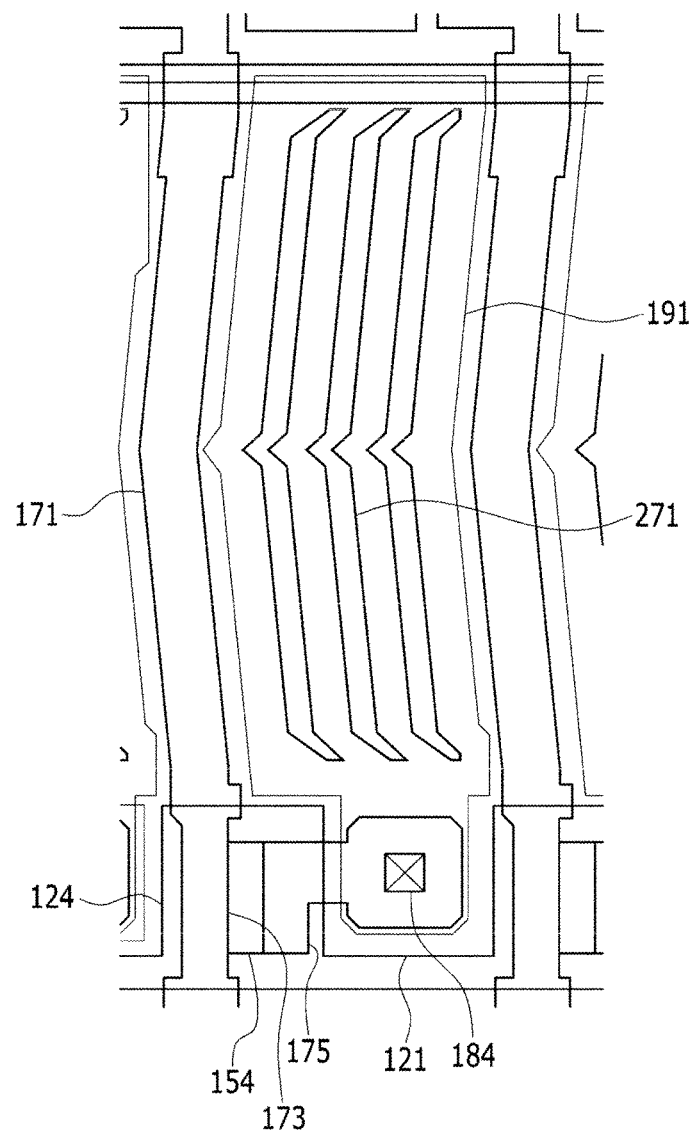
FIG. 2 is a diagram illustrating one pixel of a display device according to an exemplary embodiment of the present inventive concept.
Figure 3:
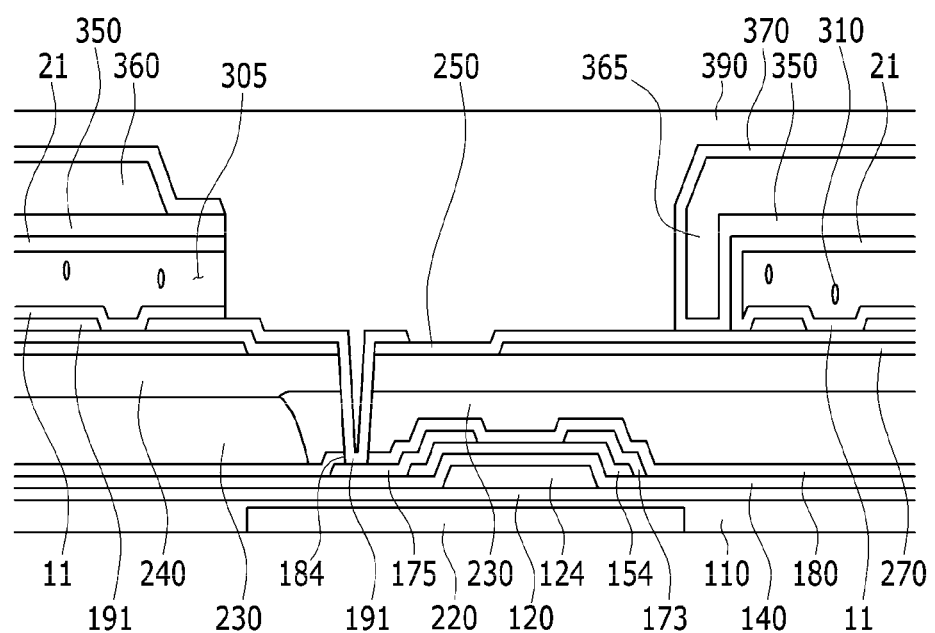
FIG. 3 is a cross-sectional view of the display device of FIG. 1 taken along a line III-III.
Figure 4A:
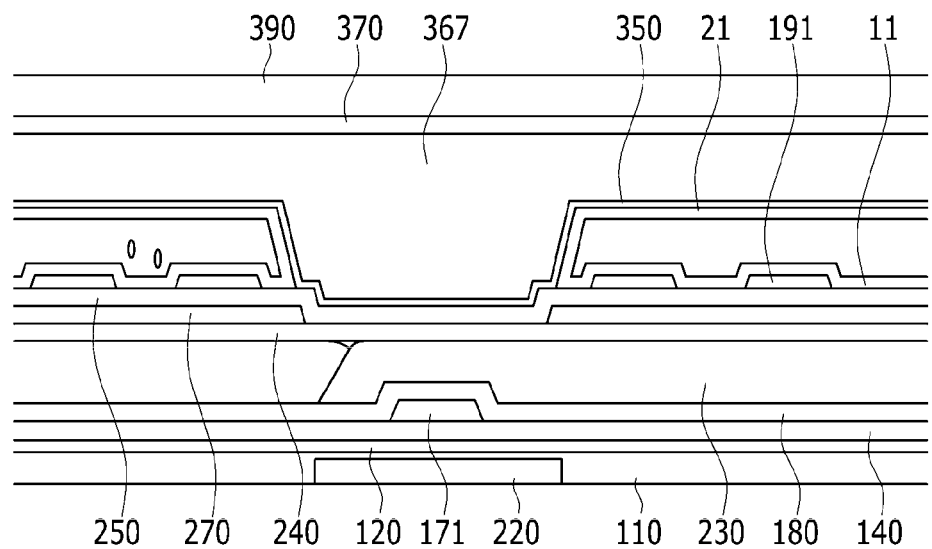
FIG. 4A and 4B are cross-sectional views of the display device of FIG. 1 taken along a line IV-IV.
Figure 4B:
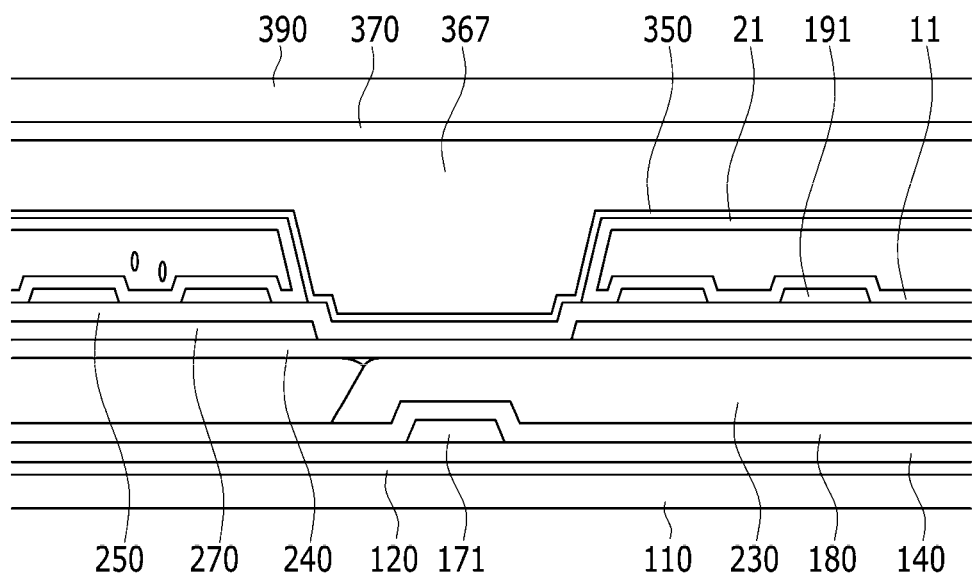
Figure 5:
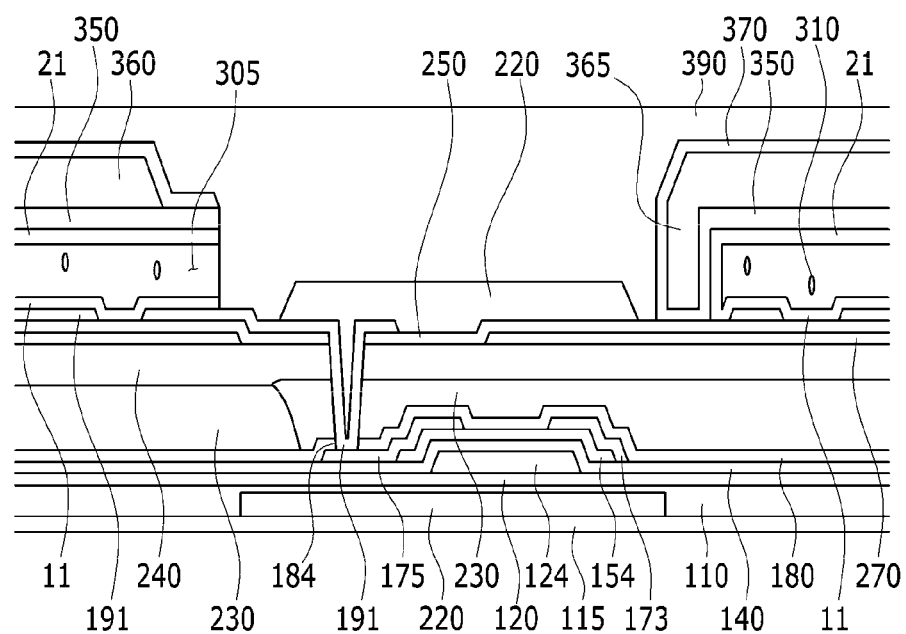
FIG. 5 is a cross-sectional view illustrating a display device according to another exemplary embodiment of the present inventive concept.
Figure 6:
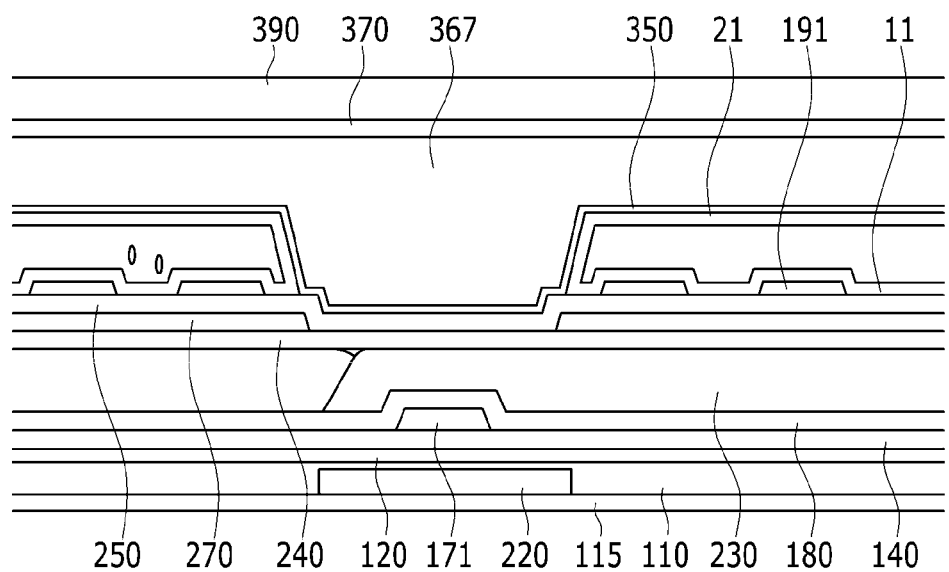
FIG. 6 is a cross-sectional view illustrating a display device according to another exemplary embodiment of the present inventive concept.

Hereinafter, a display device according to an exemplary embodiment of the present inventive concept will be described in detail with reference to FIGS. 2 to 6. FIG. 2 is a diagram illustrating one pixel of a display device according to an exemplary embodiment of the present inventive concept. FIG. 3 is a cross-sectional view of the display device of FIG. 1 taken along a line III-III. FIG. 4A and 4B are cross-sectional views of the display device of FIG. 1 taken along a line IV-IV. FIGS. 5 and 6 are diagrams according to other exemplary embodiments of the present inventive concept.

Referring to FIGS. 2 and 3, first, a black matrix 220 is formed on a lowermost surface. The black matrix 220 may be formed on a carrier glass on which other upper structures are formed. The carrier glass is removed in a last step of a manufacturing process. A detailed manufacturing method will be described below.

The black matrix may be formed at both positions corresponding to the first valley and the second valley of FIG. 1 or may be formed at only the first valley. FIG. 3 is a cross-sectional view of the display device of FIG. 1 taken along a line III-III. In this regard, the black matrix 220 is formed on a lower surface of the insulating substrate 110.

FIGS. 4A and 4B are cross-sectional views of the display device of FIG. 1 taken along a line IV-IV. FIG. 4A illustrates a display device in which the black matrix 220 is formed in a second valley, and FIG. 4B illustrates a display device in which the black matrix 220 is not formed in the second valley.

Referring to FIGS. 3 and 4, the black matrix 220 is formed on a lowermost surface of the display device. The black matrix 220 may be formed on a carrier glass which is removed after completing the manufacturing process of the display device.

The insulation substrate 110 is formed on the black matrix 220. The insulation substrate 100 may be formed of plastic. The insulation substrate 110 may cover an upper portion of the black matrix 220.

When the insulation substrate 110 is formed of plastic, a step difference between a region in which the black matrix 220 is formed and a region in which the black matrix 220 is not formed is not generated due to the planarization characteristic of the plastic.

That is, the insulation substrate 110 formed of plastic may have a flat upper portion despite the black matrix 220 present below the insulation substrate 110. This is because a plastic material is uniformly coated to form the display device during manufacture of the display device. The insulation substrate 110 may be formed of any plastic material but may be formed of polyamide. Alternatively, the insulation substrate 110 may be formed of polyimide.

Since a plastic substrate material is uniformly coated on the black matrix 220, formation of the black matrix 220 below the insulation substrate 110 does not cause any structural instability in a structure formed on the insulation substrate 110.

When the insulation substrate 110 is formed of glass, the glass corresponding to the black matrix may be etched to planarize lower and upper portions of the insulation substrate 110.

Then a barrier layer 120 may be formed on the insulation substrate 110. The barrier layer 120 may be formed of silicon nitride. That is, the barrier layer 120 may include $SiN_x$. However, the barrier layer 120 may be omitted.

With regard to the display device according to the exemplary embodiment of FIGS. 3, 4A and 4B, the black matrix 220 is formed on a lowermost surface of the display device.

That is, in the case of the display device according to the exemplary embodiment of FIGS. 3, 4A and 4B, the black matrix 220, the insulation substrate 110, and the barrier layer 120 are sequentially formed on the carrier glass (not shown).

However, referring to FIGS. 5 and 6, the display device may further include a lower insulation substrate 115 formed on a lower surface of the black matrix 220.

Accordingly, the lower insulation substrate 115 is positioned on a lowermost surface of the display device, and the black matrix 220, the insulation substrate 110, and the barrier layer 120 are sequentially stacked on the lower insulation substrate 115. The lower insulation substrate 115 may be formed of the same material as the insulation substrate 110. That is, the lower insulation substrate 115 may be formed of plastic and may be formed of polyamide or polyimide.

When the lower insulation substrate 115 is positioned below the black matrix 220, the black matrix 220 may be protected by the lower insulation substrate 115. In addition, during manufacture, the lower insulation substrate 115 is formed on the carrier glass to form the black matrix 220 and the lower insulation substrate 115 and the carrier glass are separated from each other during removal of the carrier glass, and thus the black matrix 220 may be prevented from being damaged during removal of the carrier glass. However, the lower insulation substrate 115 may be omitted.

A gate conductor 124 including a gate line 121 is formed on the barrier layer 120.

The gate line 121 includes a wide end portion (not shown) for connection with a gate electrode 124 and other layers or an external driving circuit. The gate line 121 may be formed of an aluminum based metal such as aluminum (Al) or aluminum alloy, a silver based metal such as silver (Ag) or silver alloy, a copper based metal such as copper (Cu) or copper alloy, a molybdenum based metal such as molybdenum (Mo) or molybdenum alloy, chromium (Cr), tantalum (Ta), titanium (Ti), etc. However, the gate line 121 may have a multilayer structure including at least two conductive layers with different physical properties.

A gate insulating layer 140 formed of silicon nitride ($SiN_x$), silicon oxide ($SiO_x$), or the like is formed on a gate conductor 121 and 124. The gate insulating layer 140 may have a multilayer structure including at least two insulating layers with different physical properties.

A semiconductor 154 formed of amorphous silicon, polysilicon, or the like is formed on the gate insulating layer 140. The semiconductor 154 may include an oxide semiconductor.

An ohmic contact (not shown) is formed on the semiconductor 154. The ohmic contact (not shown) may be formed of a material such as n+hydrogenated amorphous silicon doped with high concentration n-type impurity such as phosphorus or silicide. A pair of ohmic contacts (not shown) may be disposed on the semiconductor 154. When the semiconductor 154 is an oxide semiconductor, the ohmic contact may be omitted.

A data line 171 including a source electrode 173 and a data conductor including a drain electrode 175 are formed on the semiconductor 154 and the gate insulating layer 140.

The data line 171 includes a wide end portion (not shown) for connection with other layers or an external driving circuit. The data line 171 transmits a data signal and mostly extends in a vertical direction to cross the gate line 121.

The data line 171 may have a first curved portion that is curved in order to achieve maximum transmittance of a liquid crystal display and curved portions may meet each other in an intermediate region of a pixel area to form a shape 'V'. The intermediate region of the pixel area may further include a second curved portion that is curved to form a predetermined angle with the first curved portion.

The first curved portion of the data line 171 may be curved to form an angle of about 7 degrees with a vertical reference line that forms 90 degrees with a direction in which the gate line 121 extends. The second curved portion disposed in the intermediate region of the pixel area may be further curved to form from about 7 degrees to about 15 degrees with the first curved portion.

The source electrode 173 is a portion of the data line 171 and is disposed on the same level as the data line 171. The drain electrode 175 is formed to extend in parallel to the source electrode 173. Accordingly, the drain electrode 175 extends in parallel to a portion of the data line 171.

The gate electrode 124, the source electrode 173, and the drain electrode 175 constitute one thin film transistor (TFT) together with the semiconductor 154, and a channel of the thin film transistor is formed in the semiconductor 154 between the source electrode 173 and the drain electrode 175.

A display device according to an exemplary embodiment of the present inventive concept may include the source electrode 173 positioned on the same level as the data line 171 and the drain electrode 175 that extends in parallel to the data line 171 so as to widen the width of the thin film transistor without widening an area occupied by a data conductor, thereby increasing an aperture ratio of the display device.

However, in the case of a display device according to another exemplary embodiment of the present inventive concept, the source electrode 173 and the drain electrode 175 may have different forms.

The data line 171 and the drain electrode 175 may be formed of a refractory metal such as molybdenum, chromium, tantalum, titanium or alloy thereof and may have a multilayer structure including a refractory metal layer (not shown) and a low-resistance conductive layer (not shown). An example of the multilayer structure may include a dual layer of a lower layer of chromium or molybdenum (alloy) and an upper layer of aluminum (alloy), and a triple layer of a lower layer of molybdenum (alloy), an intermediate layer of aluminum (alloy), and an upper layer of molybdenum (alloy). However, the data line 171 and the drain electrode 175 may be formed of various metals or conductors other than the above materials.

A passivation layer 180 is formed on an exposed portion of the data conductors 171, 173, and 175, the gate insulating layer 140, and the semiconductor 154. The passivation layer 180 may be formed of an organic insulating material, an inorganic insulating material, or the like.

A color filter 230 is formed in each pixel area PX on the passivation layer 180. Each color filter 230 may display one of primary colors such as three primary colors of red, green, and blue. The color filter 230 is not limited to the three primary colors of red, green, and blue and may display cyan, magenta, yellow, white-based color, etc. Unlike in the diagram, the color filter 230 may longitudinally extend in a column direction along a portion between neighboring data lines 171.

An organic layer 240 is disposed on the color filter 230. The organic layer 240 may be thicker than that of the passivation layer 180 and may have a flat surface.

The organic layer 240 may be formed in a display area in which a plurality of pixels are disposed and may not be formed in a peripheral area in which a gate pad portion, a data pad portion, etc. are disposed. Alternatively, the organic layer 240 may be also formed in a peripheral area in which a gate pad portion, a data pad portion, etc. are disposed.

A common electrode 270 is formed on the organic layer 240. The common electrode 270 may have a surface shape, may be disposed in a display area in which a plurality of pixels are disposed, and may not be formed in a peripheral area in which a gate pad portion, a data pad portion, or the like is disposed.

The common electrode 270 may be formed of a transparent conductive layer such as ITO or IZO.

An insulating layer 250 is formed on the common electrode 270. The insulating layer 250 may be formed of an inorganic insulating material such as silicon nitride ($SiN_x$), silicon oxide ($SiO_x$), silicon nitride oxide ($SiO_xN_y$). The insulating layer 250 performs a function of protecting the color filter 230, etc. formed of an organic material and a function of insulating the common electrode 270 and pixel electrode 191 from each other. That is, even if the common electrode 270 is formed to overlap a pixel electrode 191, the insulating layer 250 formed on the common electrode 270 prevent the common electrode 270 and the pixel electrode 191 from contacting each other, thereby preventing short-circuit between the common electrode 270 and the pixel electrode 191.

The organic layer 240, the color filter 230, and the passivation layers 180 and 250 have a contact hole 184. The pixel electrode 191 is formed on the insulating layer 250. The pixel electrode 191 includes a curved edge positioned in approximately parallel to the first curved portion and the second curved portion of the data line 171.

The pixel electrode 191 is formed of a transparent conductive layer such as ITO or IZO.

The pixel electrode 191 is physically and electrically connected to the drain electrode 175 through the contact hole 184 formed through the organic layer 240, the color filter 230, and the passivation layers 180 and 250 and receives an applied voltage from the drain electrode 175.

The pixel electrode 191 receives an applied data voltage from the drain electrode 175, and the common electrode 270 receives an applied reference voltage of predetermined amplitude from a reference voltage applier disposed outside the display area.

According to the applied voltage, the pixel electrode 191 and the common electrode 270 generate an electric field, and liquid crystal molecules of a liquid crystal layer 310 disposed between the two electrodes 191 and 270 are rotated in a direction parallel to a direction of the electric field. According to the above determined rotation direction of the liquid crystal molecules, polarization of light passing through the liquid crystal layer is varied.

A sacrificial layer 300 may be formed on the pixel electrode 191.

A lower insulating layer 350 may be further formed on the sacrificial layer 300 and the pixel electrode 191. The lower insulating layer 350 may be spaced apart from the pixel electrode 191 by a predetermined distance. The lower insulating layer 350 may be formed of an inorganic insulating material such as silicon nitride ($SiN_x$), silicon oxide ($SiO_x$).

Then the roof layer 360 is formed on the lower insulating layer 350. The roof layer 360 may be formed of an organic material. The microcavity 305 may be formed below the roof layer 360, and the roof layer 360 may be hardened via a hardening process to maintain a shape of the microcavity 305. The roof layers 360 may be formed to be spaced apart from each other.

The roof layer 360 is formed in each pixel area PX and the second valley V2 along a pixel row. The roof layer 360 is not formed in the first valley V1. The microcavity 305 is not formed below the roof layer 360 in the second valley V2. Accordingly, the roof layer 360 formed in the second valley V2 may be formed to be thicker than that of the roof layer 360 positioned in the pixel area PX. An upper surface and opposite lateral surfaces of the microcavity 305 are covered by the roof layer 360.

The injection hole 307 through which a portion of the microcavity 305 is exposed is formed in the roof layer 360. The lower insulating layer 350 adjacent to a region in which the injection hole 307 is formed may include a region that protrudes compared with the roof layer 360.

The injection hole 307 according to an exemplary embodiment of the present inventive concept may be formed at one edge of the pixel area PX. For example, the injection hole 307 may be formed to expose one surface of the microcavity 305 so as to correspond to a lower side of the pixel area PX. On the other hand, needless to say, the injection hole 307 may be formed to correspond to an upper side of the pixel area PX.

A position in which the injection hole 307 is formed will now be described in terms of the microcavity 305. The injection hole 307 may be formed at any one of two facing edges of each of the microcavities 305.

Since the microcavity 305 is exposed through the injection hole 307, an aligning agent, a liquid crystal material, or the like may be injected into the microcavity 305 through the injection hole 307.

A supporting member 365 may be formed below the roof layer 360 so as to face the injection hole 307, and for example, may be a horizontal supporting member 365. That is, when the injection hole 307 is formed to correspond to one edge of the microcavity 305, the supporting member 365 is positioned at an opposite edge corresponding to the one edge.

The microcavity 305 is formed below the roof layer 360, and there is concern about a phenomenon that the roof layer 360 sags into the injection hole 307 which corresponds to an inlet of the microcavity 305. In the display device according to an exemplary embodiment of the present inventive concept, the supporting member 365 formed at a position facing injection hole 307 supports the roof layer 360, thereby preventing the roof layer 360 from sagging.

The supporting member 365 is formed at any one of facing edges of two adjacent microcavities 305. The plurality of microcavities 305 is disposed in the form of a matrix including a plurality of rows and a plurality of columns. For example, the microcavity 305 may have a rectangular shape, and a lower edge of the microcavity 305 of a first row and an upper edge of the microcavity 305 of a second row may face each other. In this case, the supporting member 365 is formed at any one of the lower edge of the microcavity 305 of the first row and the upper edge of the microcavity 305 of the second row, which face each other. When the supporting member 365 is formed at the lower edge of the microcavity 305 of the first row, the supporting member 365 is also formed at a lower edge of the microcavity 305 of the second row, and also, the converse may be possible.

In this case, positions at which the supporting member 365 and the injection hole 307 are formed are different. That is, when the injection hole 307 is formed at an edge corresponding to an upper side of the microcavity 305, the supporting member 365 is formed at an edge corresponding to a lower side of the microcavity 305. Also, the converse may be possible. When the injection hole 307 is formed at an edge corresponding to a lower side of the microcavity 305, the supporting member 365 is formed at an edge corresponding to an upper side of the microcavity 305. In the region in which the injection hole 307 is formed, the insulating layer 350 includes a region that protrudes compared with the roof layer 360.

The first valley V1 is formed between the microcavities 305 positioned in different rows. A position of the supporting member 365 will now be described in terms of the first valley V1. The supporting member 365 may be formed adjacent to one side of the first valley V1.

The supporting member 365 may be connected to the roof layer 360 and may be formed of the same material as the roof layer 360. The lower insulating layer 350 may be positioned below the supporting member 365.

However, the present inventive concept is not limited thereto. The supporting member 365 may be formed of a different material from that of the roof layer 360, and the lower insulating layer 350 may not be positioned below the supporting member 365. In this case, the supporting member 365 may be formed just above the pixel electrode 191.

A planar shape of the supporting member 365 is illustrated as a quadrangle but is not limited thereto. The planar shape may have various shapes such as a circle, a triangle.

The supporting member 365 may be aligned with one end of the roof layer 360, as shown in FIG. 3. For example, when the supporting member 365 is positioned at an edge of the upper side of the microcavity 305, the edge of the upper side of the roof layer 360 and an edge of the supporting member 365 may be matched with each other.

An upper insulating layer 370 may be further formed on the roof layer 360. The upper insulating layer 370 may be formed of an inorganic insulating material such as silicon nitride ($SiN_x$), silicon oxide ($SiO_x$). The upper insulating layer 370 may be formed to cover an upper surface and lateral surface of the roof layer 360. The upper insulating layer 370 may protect the roof layer 360 formed of an organic material and may be omitted as necessary.

The upper insulating layer 370 may contact the second insulating layer 350 that protrudes compared with the roof layer 360 in a region in which the injection hole 307 is positioned, as shown in FIG. 3. The upper insulating layer 370 may have a stepped sectional view by a step difference between a region that contacts the second insulating layer 350 and a region that covers the roof layer 360.

The upper insulating layer 370 may be connected to the second insulating layer 350. The upper insulating layer 370 may be connected to or may overlap with the second insulating layer 350 at an opposite position corresponding to the injection hole 307, that is, a region in which the supporting member 365 is positioned.

The microcavity 305 is formed between the pixel electrode 191 and the lower insulating layer 350. That is, the microcavity 305 is surrounded by the pixel electrode 191 and the lower insulating layer 350. The width and the area of the microcavity 305 may be changed in various ways according to the size and resolution of the display device.

A first alignment layer 11 is formed on the pixel electrode 191. The first alignment layer 11 may be formed on a portion that is not covered by the pixel electrode 191, which is positioned just above the insulating layer 250.

A second alignment layer 21 is formed below the lower insulating layer 350 so as to face the first alignment layer 11.

The first alignment layer 11 and the second alignment layer 21 may be formed of a vertical alignment layer and may be formed of an alignment material such as polyamic acid, polysiloxane and polyimide. The first and second alignment layers 11 and 21 may be connected to each other at an edge of the pixel area PX, as shown in FIG. 3.

A crystal layer formed of liquid crystal molecules 310 is formed in the microcavity 305 positioned between the pixel electrode 191 and the lower insulating layer 350.

An overcoat 390 may be formed on the upper insulating layer 370. The overcoat 390 is formed to cover the injection hole 307 which externally exposes a portion of the microcavity 305. That is, the overcoat 390 may seal the microcavity 305 so as to prevent the liquid crystal molecules 310 formed in the microcavity 305 from externally leaking. The overcoat 390 contacts the liquid crystal molecules 310, and thus overcoat 390 may be formed of a material that is not reacted with the liquid crystal molecules 310. For example, the overcoat 390 may be formed of parylene, etc.

The overcoat 390 may be formed of a multilayer such as a dual layer or a triple layer. The dual layer includes two layers formed of different materials. The triple layer includes three layers and materials of adjacent layers are different. For example, the overcoat 390 may include a layer formed of an organic insulating material and a layer formed of an inorganic insulating material.

Although not illustrated, a polarizer may be further formed on upper and lower surfaces of the display device. The polarizer may include a first polarizer and a second polarizer. The first polarizer may be attached to a lower surface of the substrate 110 and the second polarizer may be attached onto the overcoat 390.

In this case, as described above, the black matrix 220 is formed on the lower surface of the display device. Accordingly, in the case of a structure (FIGS. 3 and 4) in which the black matrix is positioned at a lowermost layer (FIGS. 3 and 4), the first polarizer and the black matrix 220 may directly contact each other. Alternatively, a separate member may be formed between the black matrix 220 and the first polarizer.

In the case of a structure (FIGS. 5 and 6) in which the lower insulation substrate 115 is positioned below the black matrix 220, the lower insulation substrate 115 and the first polarizer may directly contact each other. Alternatively, a separate member may be formed between the lower insulation substrate 115 and the first polarizer.

Although not illustrated, the display device according to the present inventive concept may include a light unit. In this case, the light unit may be positioned at a side of the overcoat 390. Accordingly, a viewer may see a side of the insulation substrate 110. That is, in the display device according to the present inventive concept, the light unit 390 is formed on the overcoat 390 such that the viewer sees an upper surface of the insulation substrate 110. However, the converse may also be possible, that is, the light unit 390 is position below the insulation substrate 110 such that the viewer sees an image at a side of the overcoat 390.

Hereinafter, a method of manufacturing a display device according to an exemplary embodiment of the present inventive concept will be described with reference to FIGS. 7 to 14. FIGS. 7 to 14 are cross-sectional views of processes of a method of manufacturing a display device according to the present inventive concept with respect to the same sectional view as in FIG. 3.

Figure 7:
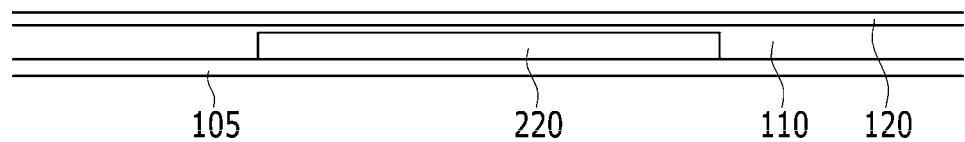
FIGS. 7, 8, 9, 10, 11, 12, 13 and 14 are cross-sectional views of processes of a method of manufacturing a display device according to the present inventive concept with respect to the same sectional view as in FIG. 3.

First, as shown in FIG. 7, the black matrix 220 is formed on a carrier glass 105. The carrier glass 105 is used to ensure structural stability during manufacturing processes and is removed after the display device is completely manufactured.

As described above, the black matrix 220 may be formed on both the first valley and the second valley or may be formed only on the first valley.

Although not illustrated, a lower insulation substrate 115 may be formed prior to formation of the black matrix 220.

Then the insulation substrate 110 is formed on the black matrix 220. The insulation substrate 100 may be formed of glass or plastic but may be formed of plastic. When the insulation substrate 110 is formed of glass, grooves may be formed in a contact surface of the insulation substrate 110 according to a shape of the black matrix 220.

When the insulation substrate 110 is formed of plastic, a plastic material is coated to form the insulation substrate 110. In this case, the coated plastic material is formed to cover the pre-formed black matrix 220 to planarize an upper portion of the insulation substrate 110.

In this case, the used plastic may be, but is not limited to, polyamide or polyimide.

Then the barrier layer 120 is formed on the insulation substrate 110. The barrier layer 120 may be formed of silicon nitride. That is, the barrier layer 120 may include $SiN_x$. However, the barrier layer 120 may be omitted.

Figure 8:
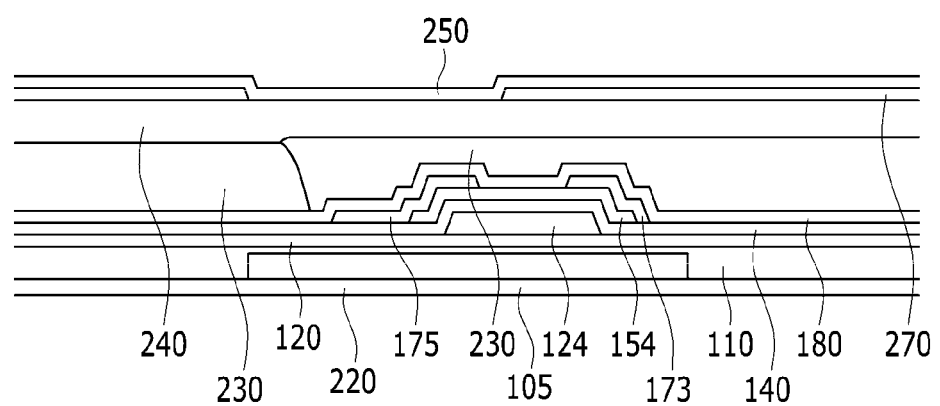

Then, as shown in FIG. 8, the gate line including a gate electrode 124 is formed on the barrier layer 120 and the gate insulating layer 140 is formed on the gate electrode 124. The semiconductor 154, the data line 171 including the source electrode 173, and the drain electrode 175 are formed on the gate insulating layer 140. The passivation layer 180 is formed on the data line 171 and the drain electrode 175.

Then the color filter 230 is formed in each pixel area PX on the passivation layer 180. The color filter 230 may be formed in each pixel area PX and may not be formed on the first valley V1. In addition, the same color of the color filter 230 may be formed in a column direction of the plurality of pixel areas PX. When three colors of the color filters 230 are formed, a first color of the color filter 230 may be first formed and then a second color of the color filter 230 may be formed by shifting a mask used to form the first color of the color filter 230. Then the second color of the color filter 230 is formed and then a third color of the color filter 230 may be formed by shifting a mask used to form the second color of the color filter 230.

Then the organic layer 240 and the common electrode 270 are formed on the color filter 230, and the insulating layer 250 is formed of an inorganic insulating material such as silicon nitride ($SiN_x$), silicon oxide ($SiO_x$) on the common electrode 270.

Then the passivation layer 180, the color filter 230, and the insulating layer 250 are etched to form the contact hole 184 so as to expose a portion of the drain electrode 175.

Figure 9:
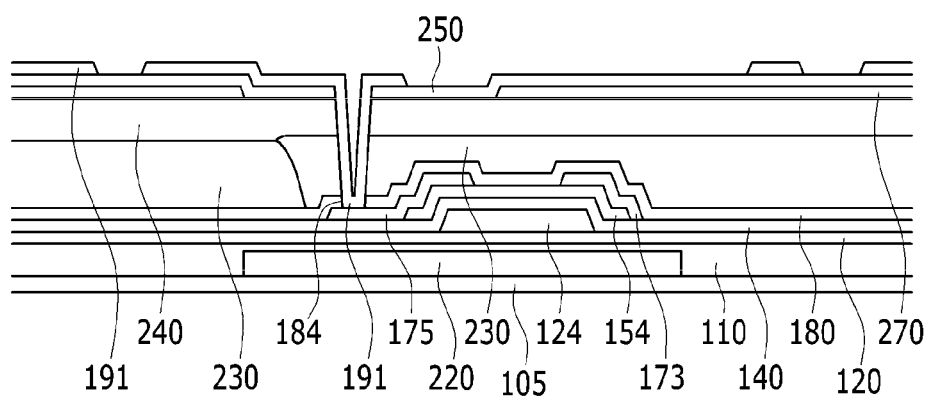

Then, as shown in FIG. 9, a transparent metal material such as indium-tin oxide (ITO), indium-zinc oxide (IZO) is deposited on the insulating layer 250 and patterned to form the pixel electrode 191 in the pixel area PX. The pixel electrode 191 is formed to be connected to the drain electrode 175 through the contact hole 184.

Figure 10:
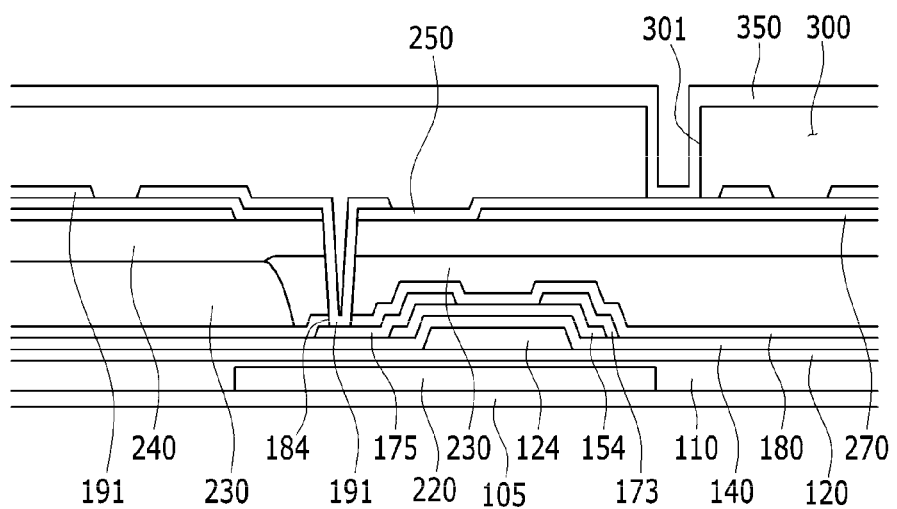

Then, as shown in FIG. 10, a photosensitive organic material is coated on the pixel electrode 191 and a sacrificial layer 300 is formed via a photolithography process.

Sacrificial layers 300 are formed to be connected to each other along a plurality of pixel columns. That is, the sacrificial layer 300 is formed to cover each pixel area PX and a photosensitive organic material positioned on the second valley V2 is removed. In addition, a partial region of the sacrificial layer 300 is removed via a photo process to form an opening 301. The opening 301 may be formed to be adjacent to the first valley V1. According to formation of the opening 301, the lower insulating layer 250 positioned below a photosensitive organic material is exposed.

As shown in FIG. 10, the lower insulating layer 350 may be formed of an inorganic insulating material such as silicon oxide or silicon nitride on the sacrificial layer 300.

Figure 11:
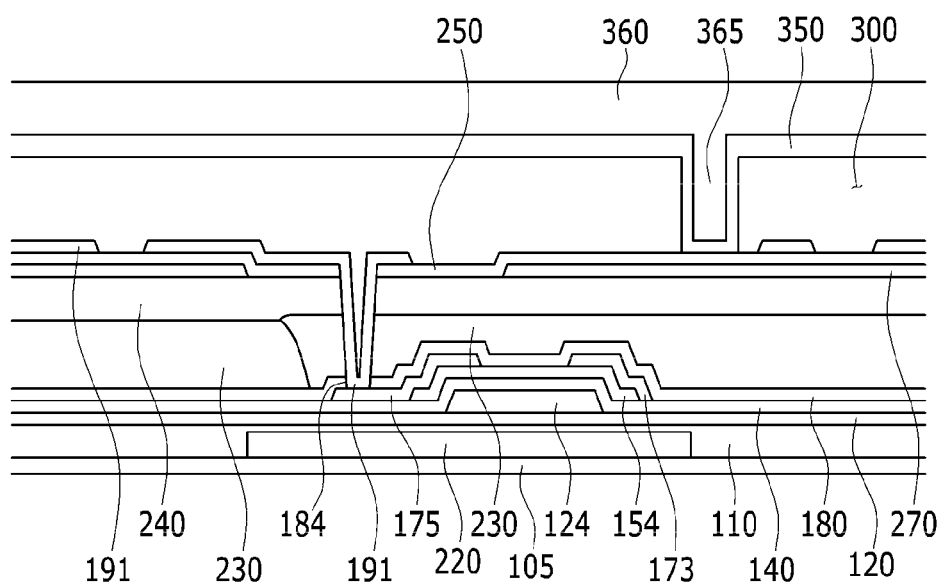

Then, as shown in FIG. 11, the roof layer 360 is formed of an organic material on the lower insulating layer 350 and the supporting member 365 is formed in the opening 301. The roof layer 360 and the supporting member 365 may be formed of the same material in the same process.

The lower insulating layer 350 may be positioned below the roof layer 360 and the supporting member 365.

The supporting member 365 may be shaped like a column and a planar shape of the supporting member 365 viewed from above the substrate 110 may have various shapes such as a circle, a quadrangle, a triangle.

Figure 12:
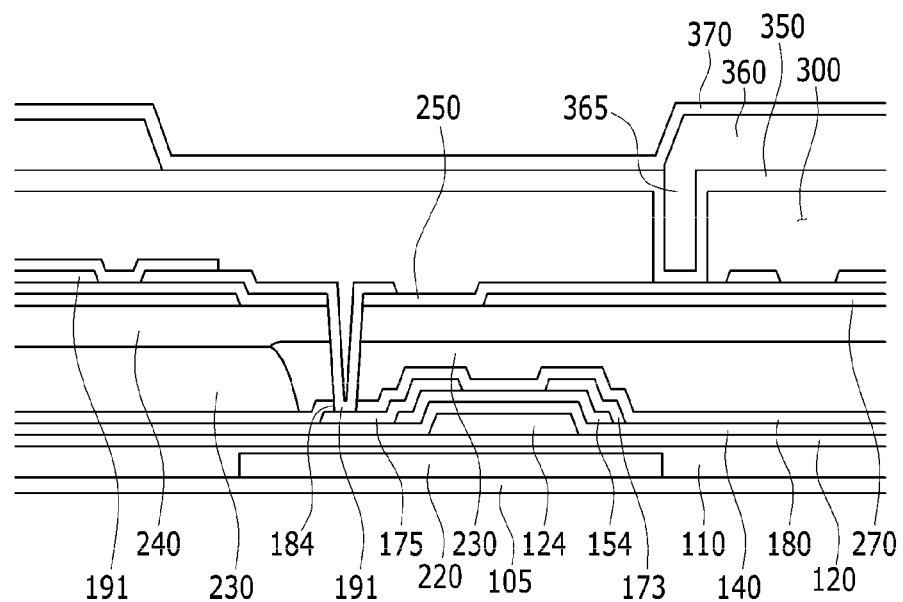

Then, as shown in FIG. 12, the roof layer 360 may be patterned to remove the roof layer 360 positioned on the first valley V1. Accordingly, the roof layers 360 are removed to be connected to each other along a plurality of pixel rows.

In addition, the supporting member 365 and one end of the roof layer 360 may be formed to be matched with each other. For example, when the supporting member 365 is positioned at an edge of an upper side of the microcavity 305, an edge of an upper side of the roof layer 360 and an edge of the supporting member 365 may be matched with each other.

Then the upper insulating layer 370 may be formed of an inorganic insulating material such as silicon nitride (SiN$_x$), silicon oxide (SiO$_x$) on the roof layer 360. The upper insulating layer 370 may be formed on the patterned roof layer 360 so as to cover and protect a lateral surface of the roof layer 360.

Figure 13:
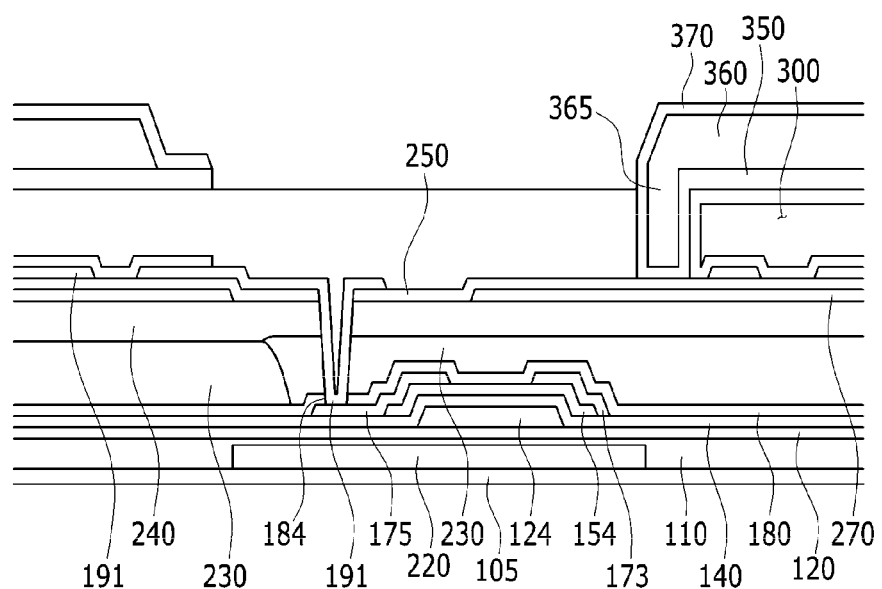

Then, as shown in FIG. 13, the upper insulating layer 370 and the lower insulating layer 350 are patterned to remove the upper insulating layer 370 and the lower insulating layer 350 that are positioned on the first valley V1.

As such, via the patterning, the sacrificial layer 300 positioned on the first valley V1 may be externally exposed.

Then a developing solution is supplied onto a portion of the substrate 110, through which the sacrificial layer 300 is exposed, to entirely remove the sacrificial layer 300. The sacrificial layer 300 may be entirely removed via an ashing process instead of developing process. The sacrificial layer 300 may be initially removed via a developing process and the remaining sacrificial layer 300 may be completely removed via an ashing process or vice versa.

When the sacrificial layer 300 is removed, the microcavity 305 is generated in a space in which the sacrificial layer 300 was positioned.

The pixel electrode 191 and the roof layer 360 are spaced apart from each other with the microcavity 305 disposed therebetween. The roof layer 360 is formed to cover an upper surface and opposite lateral surfaces of the microcavity 305 and an opposite surface to a surface in which an injection hole is formed.

The microcavity 305 is externally exposed through a portion from which the roof layer 360 is removed, which is referred to as the injection hole 307. The injection hole 307 is formed along the first valley V1. For example, the injection hole 307 may be formed at any one of edges of the pixel area PX. That is, the injection hole 307 may be formed to expose a lateral surface of the microcavity 305 so as to correspond to any one of upper or lower edge of the pixel area PX. On the other hand, the injection hole 307 may be formed along the second valley V2.

Hereinafter, a position of the injection hole 307 and the supporting member 365 will be described.

The supporting member 365 is formed in the microcavity 305 so as to oppose an adjacent injection hole 307. One injection hole 307 is formed in one microcavity 305, and the supporting member 365 is formed according to a position in which one injection hole 307 is formed. That is, when the injection hole 307 is formed in a region corresponding to a lower edge of the microcavity 305, the supporting member 365 may be formed in a region corresponding to the upper edge of the microcavity 305.

Then heat is applied to the substrate 110 to harden the roof layer 360. This is performed in order to maintain a shape of the microcavity 305 by the roof layer 360.

Figure 14:
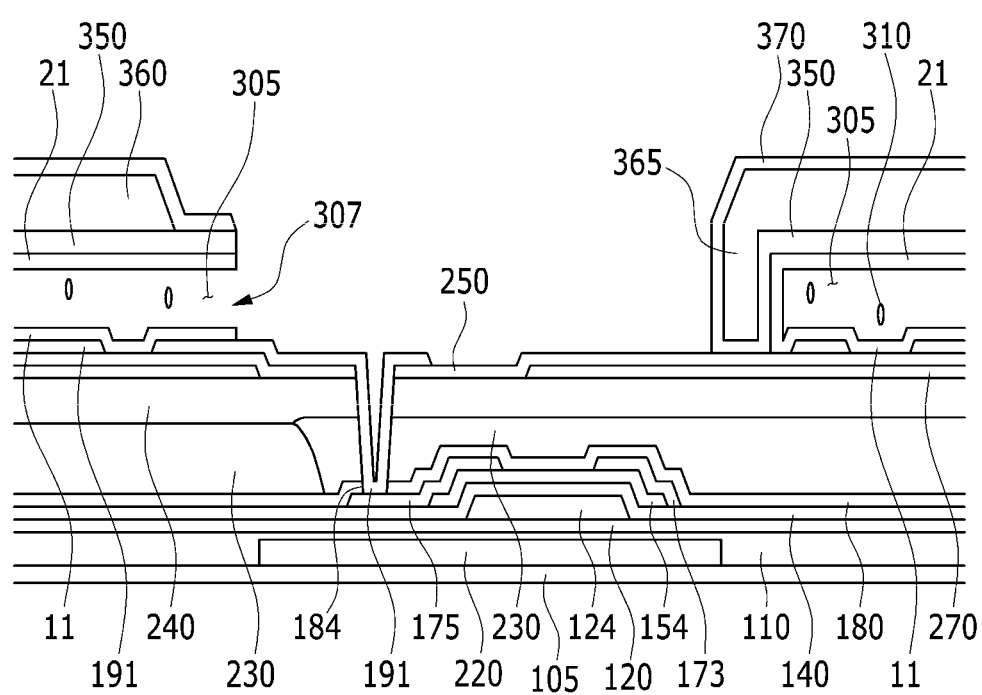

Then, as shown in FIG. 14, an aligning agent including an alignment material is dropped on the substrate 110 via a spin coating method or an inkjet method, thus the aligning agent is injected into the microcavity 305 through the injection hole 307. When the aligning agent is injected into the microcavity 305 and then a hardening process is performed, a solution component evaporates and an aligning material remains on an internal wall of the microcavity 305.

Accordingly, the first alignment layer 11 may be formed on the pixel electrode 191 and the second alignment layer 21 may be formed below the lower insulating layer 350. The first alignment layer 11 and the second alignment layer 21 are formed to face each other with the microcavity 305 disposed therebetween and to be connected to each other at an edge of the pixel area PX.

The first and second alignment layers 11 and 21 may be aligned in a vertical direction with respect to the substrate 110 except for a lateral surface of the microcavity 305. In addition, the first and second alignment layers 11 and 21 are irradiated with UV so as to perform alignment in a horizontal direction with respect to the substrate 110.

Then when a liquid crystal material including the liquid crystal molecules 310 is dropped onto the substrate 110 via an Inkjet method or a dispensing method, a liquid crystal material is injected into the microcavity 305 through the injection hole 307.

Then a material that is not reacted with the liquid crystal molecules 310 is formed on the upper insulating layer 370 to form the overcoat 390. The overcoat 390 covers the injection hole 307 through which the microcavity 305 is externally exposed, so as to seal the microcavity 305.

Then a carrier glass 150 is removed. The display device illustrated in FIG. 3 is completely manufactured by removing the carrier glass 150.

However, although not illustrated, a polarizer may be further attached to upper and lower surfaces of the display device. The polarizer may include a first polarizer and a second polarizer. The first polarizer may be attached to a lower surface of the substrate 110 and the second polarizer may be attached onto the overcoat 390.

In this case, as described above, the black matrix 220 is formed on the lower surface of the display device. Accordingly, the first polarizer may be attached directly onto the black matrix 220. Alternatively, a separate member (not shown) may be formed between the black matrix 220 and the first polarizer and then the first polarizer may be attached to the separate member.

As described above, in the display device according to an exemplary embodiment of the present inventive concept, the black matrix 220 is formed below the insulation substrate 110. Accordingly, various problems that arise when the black matrix 220 is positioned above a transistor may be overcome.

Figure 15:
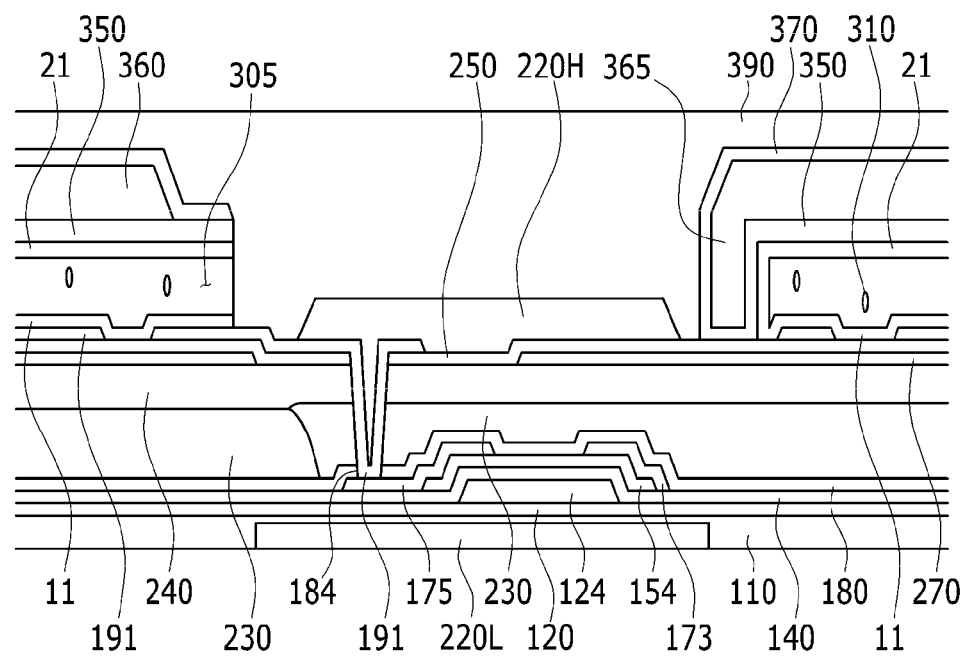
FIGS. 15 and 16 are cross-sectional view illustrating a display device according to another exemplary embodiment of the present inventive concept.
Figure 16:
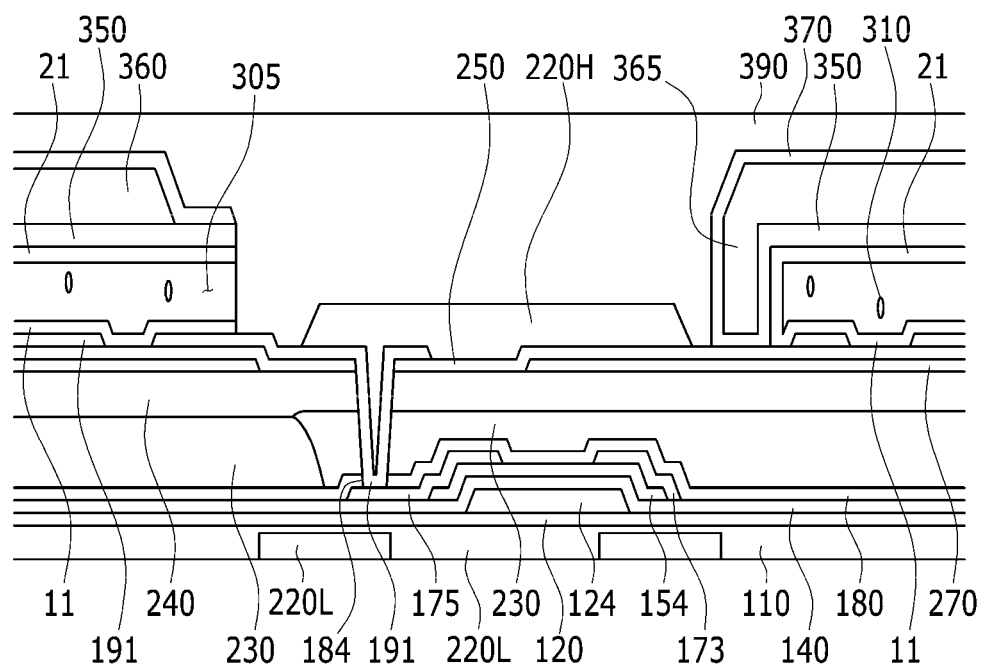

FIGS. 15 and 16 are cross-sectional view illustrating a display device according to another exemplary embodiment of the present inventive concept. Referring to FIGS. 15 and 16, most constituent elements of the display device according to the present exemplary embodiment are similar to those of the display device according to the aforementioned exemplary embodiment. A detailed description of the same or similar constituent elements will be omitted herein.

However, in the display device of FIG. 15, a black matrix is positioned below a substrate and above a transistor. That is, the black matrix includes both a lower black matrix 220L positioned below the substrate and an upper black matrix 220H positioned in a transistor region.

In this case, the width of the upper black matrix 220H may be smaller than the width of the lower black matrix 220L.

In the display device of FIG. 16, both the upper black matrix 220H and the lower black matrix 220L are formed and the lower black matrix 220L is divided. In this case, the width of the upper black matrix 220H is smaller than the width of the first valley, and the lower black matrix 220H is formed in a region of the first valley, in which the upper black matrix 220H is not formed.

Thus, the first valley is entirely shielded by the black matrix 220.

Figure 17:
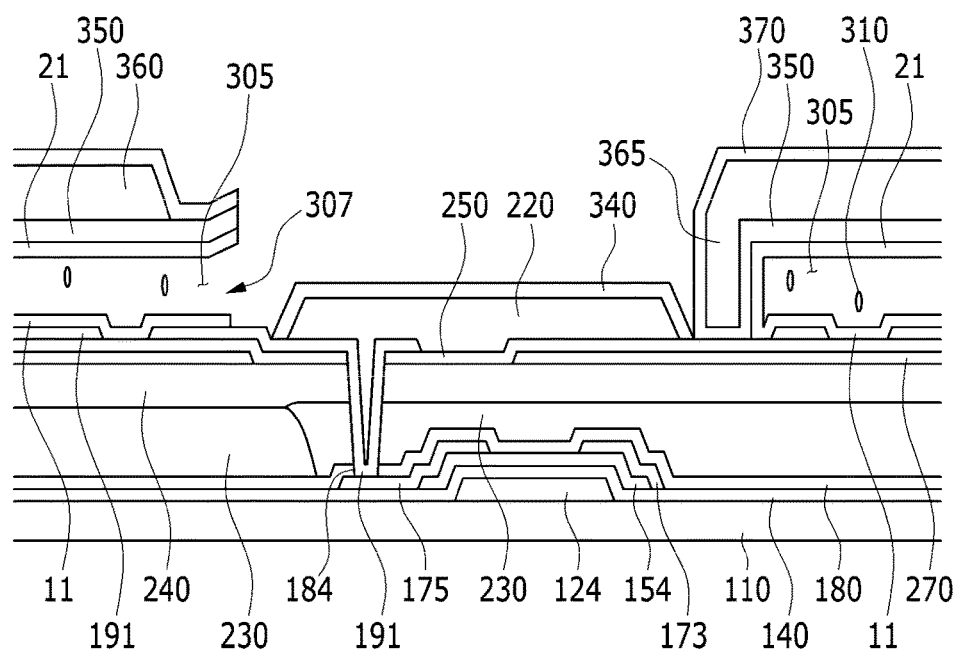
FIGS. 17 and 18 are cross-sectional view illustrating a display device according to comparative example of the present inventive concept.
Figure 18:
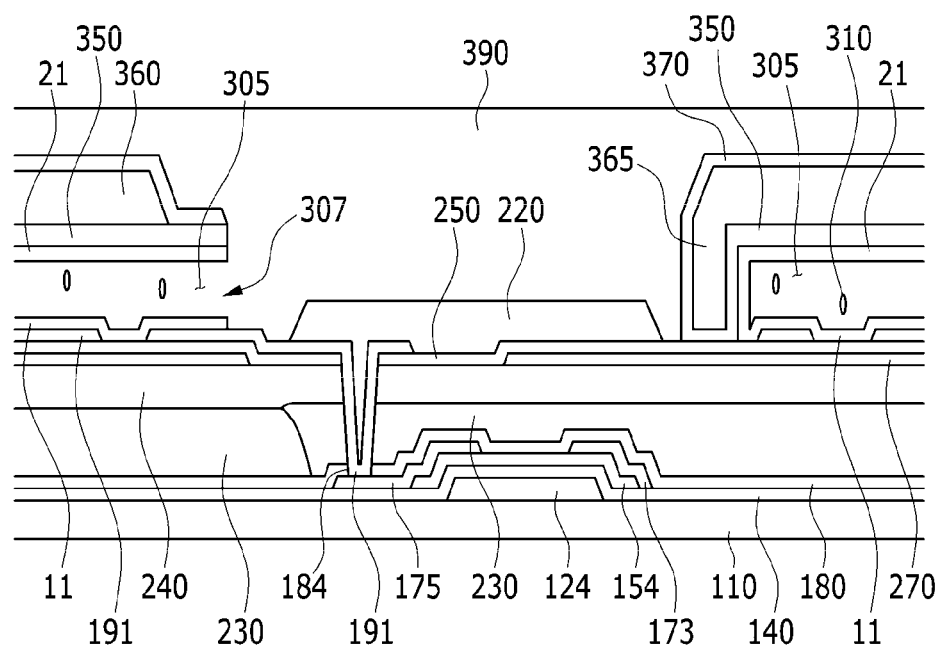

Hereinafter, an effect of a display device according to the present inventive concept will be described with reference to FIGS. 17 and 18. FIGS. 17 and 18 are diagrams illustrating a display device according to comparative example of the present inventive concept.

Referring to FIG. 17, the black matrix 220 is formed on a transistor in the display device of FIG. 17. In this case, since the width of the black matrix 220 needs to be equal to or greater than that of the first valley, a phenomenon that the alignment layer 21, the lower insulating layer 350 and the upper insulating layer 370, etc. are lifted up on a region corresponding to the black matrix 220 adjacent to the microcavity 305 occurs.

That is, as shown in FIG. 17, a structure above the microcavity 305 is lifted up by the black matrix 220 on a region corresponding to the black matrix 220 adjacent to the microcavity 305.

However, in order to prevent this problem, when the width of the black matrix 220 is reduced, light is not sufficiently shielded to enter into the semiconductor 154, thus phot leakage current may be occurred.

However, the display device according to an exemplary embodiment of the present inventive concept overcomes the problem of lifting up the structure above the microcavity 350 by positioning a black matrix below a substrate. In addition, a black matrix is positioned below a substrate, and thus the width of the black matrix may be freely adjusted as much as desired and an entire portion of a first valley may be stably shielded from incident light.

Referring to FIG. 17, in the case of the display device of comparative example illustrated in FIG. 17, a black matrix capping layer 340 is formed on the black matrix 220. The capping layer 340 prevents liquid crystal and the black matrix 220 from being contacting each other, thereby preventing liquid crystal from being contaminated by impurities from the black matrix 220 due to contact between liquid crystal and the black matrix 220.

To prevent the liquid crystal from being contaminated, the capping layer 340 on the black matrix 220 is added, and thus process for manufacturing the display device becomes complicated.

FIG. 18 is a cross-sectional view illustrating a display device according to another comparative example of the present inventive concept. In the case of the display device of FIG. 18, the width of the black matrix 220 is smaller than the width of the first valley, and thus light is not sufficiently shielded and there is concern about light leakage. In addition, a capping layer is not formed on the black matrix 220, and thus liquid crystal during injection of liquid crystal and black matrix contact each other, and the liquid crystal is highly contaminated.

However, in the case of a display device according to an exemplary embodiment of the present inventive concept, a black matrix is positioned below a substrate, and thus the width of the black matrix may be freely adjusted. Accordingly, the problem in terms of light leakage may not arise and the problem of lifting up a roof layer according to formation of the black matrix may also be overcome. In addition, since the black matrix is positioned below a substrate, a separate capping layer does not have to be formed above the black matrix, and processes may be simplified.

In addition, since the black matrix may be positioned below the substrate, contact with the liquid crystal layer may be originally prevented, thereby preventing the liquid crystal layer from being contaminated.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device, comprising:
   a substrate;
   a black matrix disposed on one side of the substrate;
   a thin film transistor disposed on the other side of the substrate;
   a common electrode and a pixel electrode disposed on the thin film transistor and overlapping with each other with an insulating layer disposed therebetween;
   a roof layer formed to be spaced apart from the pixel electrode and the common electrode with a microcavity disposed therebetween, including a supporting member, and having an injection hole through which a portion of the microcavity is exposed;
   a liquid crystal layer filling the microcavity; and
   an overcoat formed on the roof layer so as to cover the injection hole and sealing the microcavity.

2. The display device of claim 1, wherein:
   the substrate covers the black matrix and is formed of a flexible material.

3. The display device of claim 2, wherein:
   the flexible material is polyamide or polyimide.

4. The display device of claim 1, further comprising:
   a lower insulation substrate formed below the black matrix.

5. The display device of claim 4, wherein:
   the lower insulation substrate is formed of a flexible material.

6. The display device of claim 1, wherein:
   a plurality of microcavities are arranged on the substrate in a matrix form; and the plurality of microcavities are spaced apart from each other with a plurality of first valleys and a plurality of second valleys disposed therebetween, wherein the plurality of the first valleys extend along a direction in which a gate line extends and the plurality of the second valleys extend along a direction in which a data line extends.

7. The display device of claim 6, wherein:

the black matrix is formed below the substrate only at a position corresponding to the plurality of the first valleys.

8. The display device of claim 6, further comprising an upper black matrix formed on the other side of the substrate at a position in which the plurality of the first valleys are formed, wherein the black matrix is formed at a position corresponding to the plurality of the first valleys.

9. The display device of claim 8, wherein:

a width of the upper black matrix is smaller than a width of the plurality of the first valleys.

10. The display device of claim 9, wherein:

the black matrix has a first black matrix and a second black matrix which are formed at positions corresponding to opposite edges of the first valley, respectively.

* * * * *